United States Patent

[11] 3,584,241

[72] Inventor Michiyuki Nakamura
Pleasant Hill, Calif.
[21] Appl. No. 836,361
[22] Filed June 25, 1969
[45] Patented June 8, 1971
[73] Assignee The United States of America as represented by the United States Atomic Energy Commission

[54] SCHMITT TRIGGER WITH CONTROLLED HYSTERESIS
8 Claims, 3 Drawing Figs.

[52] U.S. Cl. .......... 307/290, 307/235, 307/268
[51] Int. Cl. .......... H03k 3/26
[50] Field of Search .......... 307/290, 268, 235

[56] References Cited
UNITED STATES PATENTS

| | | | |
|---|---|---|---|
| 2,923,840 | 2/1960 | Ellsworth | 307/290X |
| 3,416,004 | 12/1968 | Taylor | 307/230X |
| 3,471,718 | 10/1969 | Weisz | 307/290 |
| 3,474,264 | 10/1969 | Hughes | 307/290 |

*Primary Examiner*—Donald D. Forrer
*Assistant Examiner*—John Zazworsky
*Attorney*—Roland A. Anderson

ABSTRACT: An improved Schmitt trigger circuit in which hysteresis, the difference in input voltage level at which triggering on occurs as compared with the input level at which triggering off occurs, may be made zero or varied negatively or positively.

INVENTOR.
MICHIYUKI NAKAMURA
BY
ATTORNEY

SCHMITT TRIGGER WITH CONTROLLED HYSTERESIS

BACKGROUND OF THE INVENTION

The invention described herein was made in the course of, or under, Contract No. W-7405-ENG-48 with the United States Atomic Energy Commission.

1. Field of the Invention

This invention relates to transistor trigger circuits.

2. Prior Art

The emitter coupled binary circuit, also known as the Schmitt circuit after its inventor, has been long and well known to those schooled in the art. The basic transistorized Schmitt trigger circuit is comprised of two transistors with a common emitter resistor which provides coupling for regeneration between transistor stages. So long as the input signal is below a preset or triggering value the input transistor is normally nonconducting and the output transistor conducting. The moment the input signal voltage exceeds the preset value, there is a rapid transition of states. The normally nonconducting input transistor is triggered to a new conducting state and remains there as long as the input voltage is above a second level which is slightly lower than the initial triggering value. The normally conducting output transistor becomes nonconducting and thus forms the leading edge of the output pulse. When the input voltage drops below this second level, there is another rapid transition of states-back to the original state. The difference between the initial triggering value and the second level is termed the hysteresis effect.

Various techniques have been devised to compensate for the hysteresis effect. One technique is to place a resistor in the emitter leg of the normally conducting transistor. Another is to inject a square wave on the base of the normally conducting output transistor through the use of an astable multivibrator so that the additive base voltage is periodically reduced to a level such that if the Schmitt trigger is triggered at that time, the actual difference or hysteresis value is reduced to zero or some set value as the trigger circuit reverts to its original state. These techniques have the disadvantage in that they lengthen the rise and fall time of the output signal square wave.

SUMMARY OF THE INVENTION

The present invention comprises a method whereby the hysteresis of a conventional Schmitt trigger circuit may be selectably made zero, negative, or positive. More specifically, the invention comprises at least two resistors in series connection between the collector and base of the normally conducting output transistor, a capacitor to ground at the juncture of the above two resistors, and at least one resistor from the base to ground. During operation and when the trigger circuit is being pulsed, the inventive circuit provides feedback from the collector to the base tending to raise the voltage level at the base at the time the normally conducting transistor is turned off, thus to require the input transistor to turn off at a higher level of input signal, the effect of which is to preselect or minimize the hysteresis value. The capacitor provides a short time delay in order to prevent any slowing of the triggering time.

Accordingly, it is an object of the present invention to provide a method of eliminating the hysteresis of a transistorized Schmitt trigger circuit.

Another object of this invention is to provide a method of selectively changing the hysteresis value of a transistorized Schmitt trigger circuit.

A further object of this invention is to provide a method of selectively changing or eliminating the hysteresis of a Schmitt trigger circuit without affecting the rise and fall time of the square wave output.

DESCRIPTION OF THE PREFERRED EMBODIMENT

Figure 1:
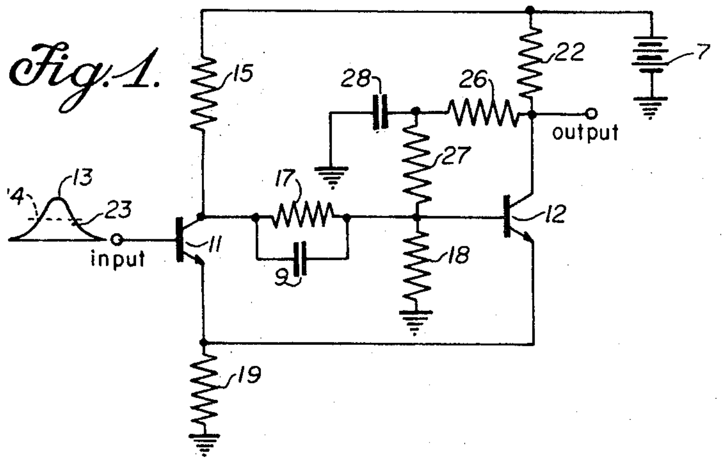
FIG. 1 is the schematic diagram of a transistorized Schmitt trigger circuit incorporating the embodiment of the invention to obtain zero hysteresis.

As shown in Figure 1, the embodiment of this invention which permits either zero, positive, or negative hysteresis is connected between the collector and base of output transistor 12 and includes series resistor 26, resistor 27, capacitor 28 which connects the juncture of the above resistors to ground, and resistor 18 from the base to ground. The remainder of the circuit in Figure 1 is the conventional Schmitt trigger comprised of the normally nonconducting input transistor 11, normally conducting output transistor 12, the output transistor biasing network consisting of series resistors 15, 17, and 18, of which, resistor 15 connects the supply voltage 7 to the input transistor 11 collector, resistor 17 connects the input transistor 11 collector to the base of output transistor 12, and resistor 18 connects output transistor 12 base to ground, the direct connection between transistor emitters which characterizes the Schmitt trigger circuit, the common emitter regenerative resistor 19 connecting the emitter to ground, and load resistor 22 connected to the collector of the output transistor 12. Speedup capacitor 9 connects the collector of the input transistor 11 to the base of the output transistor 12, paralleling resistor 17.

In operation, the Schmitt trigger circuit input transistor 11 is normally nonconducting. Biasing resistors 15, 17 and 18 are selected so that the base of output transistor 12 is biased to conduction, i.e., the voltage at the base is greater than that at the emitter, but less than that at the collector, and the transistor is conducting current through the collector-emitter terminals. Input transistor 11 is assured nonconducting so long as the base voltage is less than that on the emitter.

Figure 2:
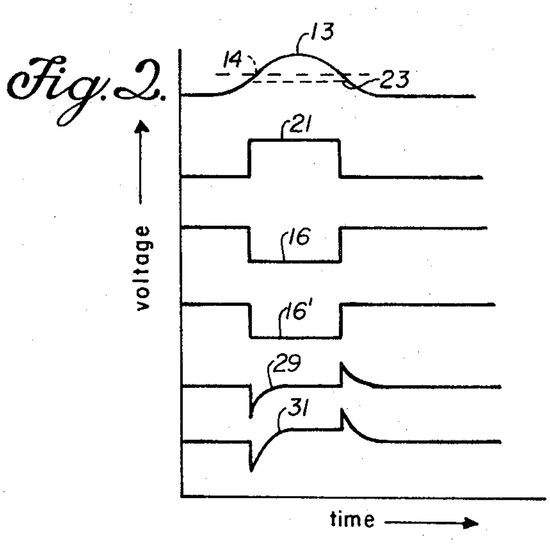
FIG. 2 illustrates the various electrical waveshapes with their time relationship that will be found within the overall circuit.

With reference to Figures 1 and 2, an input pulse 13 is applied to the base of input transistor 11. When the input signal has reached a minimum value 14 required to take input transistor 11 out of nonconduction and barely into conduction, the voltage at the collector of transistor 11 starts decreasing causing the base bias voltage on transistor 12 to decrease which in turn results in less collector-emitter current through transistor 12. This lessened emitter current causes a drop in the emitter voltage, as it appears across the regenerative resistor 19, which increases the base-emitter voltage of the input transistor 11 and increases its collector-emitter current. This regenerative process continues until output transistor 12 is cut off and input transistor 11 fully conducting.

The Schmitt trigger circuit remains in the triggered state so long as the input pulse remains above the turnoff or second level 23. Upon the input voltage falling to the second level 23, the trigger circuit reverts to its initial state; the input transistor 11 turning off and output transistor 12 starting to conduct. The turnoff or second level 23 is of a lower voltage than the turn-on level 14 of the input signal because the base-to-ground voltage across nonconducting transistor 12 is of lower value than it is when transistor 12 is in its normally conducting state. The lower voltage is caused by the reduction of the transistor 11 collector voltage when the transistor is conducting. Therefore, even though the emitter voltage of transistor 12 is still approximately the same, its base-emitter voltage is lesser than it was during the conduction state. In order to bring transistor 12 back into conduction, the input signal voltage at the base of input transistor 11 must fall to a lower second value 23 to cause a further reduction of collector-emitter current before the voltage at its collector has risen to a value great enough to put transistor 12 into conduction after passing the voltage divider network, resistors 17 and 18.

It is at this point that the feedback and bias resistor and capacitor circuit of this invention substantially function to provide either the zero, negative or positive hysteresis. Zero hysteresis is the condition when the turnoff or second level voltage 23 is the same as the turn-on level 14 of the input pulse. Positive hysteresis is achieved when the turnoff level 23 is less, voltage wise, than the turn-on level 14; this is the prevalent condition in a Schmitt trigger with no hysteresis compensation. Negative hysteresis is the condition when the turnoff value 23 is greater than the turn-on value 14. During the triggering cycle, when transistor 12 is nonconducting and the voltage at its collector has risen to its highest value, the feedback resistors between the collector and base conduct current to the base and thus raise its voltage to a level necessary to achieve the desired hysteresis. Whether zero, positive, or negative hysteresis is obtained is determined by feedback resistors 26 and 27, resistor 17, and base bias resistor 18. A selectable hysteresis may be obtained at will through the configuration illustrated in Figure 3 wherein adjustment of potentiometer 29 and 31 provide for different biasing levels at the base of output transistor 42.

The feedback resistor network and base bias resistor network do not affect the initial triggering of the Schmitt trigger circuit to any appreciable degree as they do at the termination of the input trigger pulse. During the untriggered normally conducting period of transistor 12, the collector-base voltage across transistor 12 is considerably less than it is during the nonconducting triggered period and thus much less current flows through the feedback network to tend to raise the base voltage.

The function of the capacitor 28 is to delay the feedback slightly in order to avoid slowing the rise and fall time of output signal. For fast pulse work, it is entirely possible that the stray capacitance of the feedback resistors is sufficient to provide the necessary feedback delay and the capacitive element is not necessary.

Waveform 13 is the input signal for triggering the Schmitt trigger circuit. Waveform 21 is the output square wave. Waveform 16 is the electrical waveshape appearing at the collector of input transistor 11 when the trigger circuit is being pulsed. Waveform 16' is the waveshape appearing at the base of output transistor 12 when there is no feedback from the collector to the base. Waveform 29 in Figure 2 shows the effect of the inventive feedback resistors and capacitor when the resistors are adjusted for zero hysteresis wherein the waveshape 29 is superimposed upon the voltage normally appearing at the transistor 12 base. Waveform 31 shows the waveshape for negative hysteresis.

Figure 3:
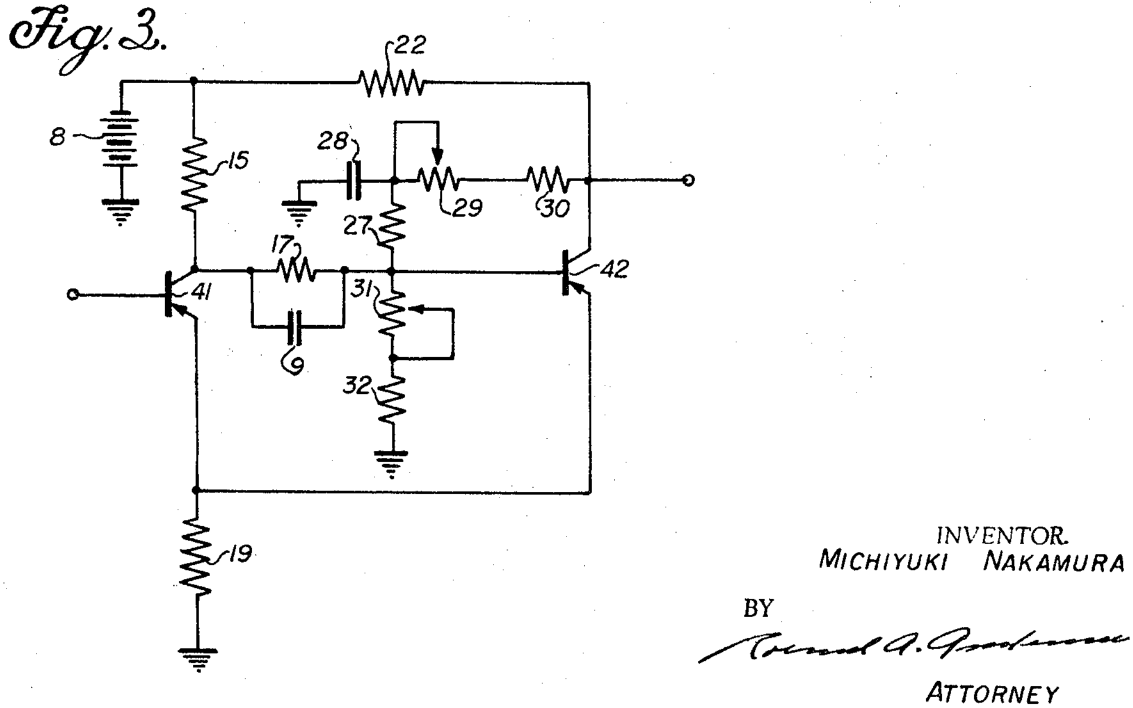
FIG. 3 is a schematic diagram incorporating potentiometers 29 and 31 which permit selective zero, negative, or positive hysteresis.

Figure 3 illustrates the alternate embodiment of the invention providing means adjustably permitting zero, negative, or positive hysteresis and showing the interchangeability of transistor types in Schmitt triggers, here shown type PNP 41 and 42 utilizing a negative voltage supply 8 and requiring a negative going control pulse (not shown).

The following Table 1 lists typical values of the inventive circuit elements for zero hysteresis. Table 2 lists typical values for the elements of the circuit when the embodiment of the invention provides means to selectably achieve zero, negative, and positive hysteresis, such as illustrated in Figure 3.

Table 1

| Circuit element | Value | Units |
|---|---|---|
| 11 | 2N706 | |
| 12 | 2N706 | |
| 9 | 51 | pf |
| 15 | 910 | Ω |
| 17 | 11 | kΩ |
| 19 | 1.5 | kΩ |
| 22 | 820 | Ω |
| 18 | 10.1 | kΩ |
| 26 | 6.4 | kΩ |
| 27 | 7.5 | kΩ |
| 28 | 0.01 | μf |

Table 2

| Circuit element | Value | Units |
|---|---|---|
| 41 | 2N2905 | |
| 42 | 2N2905 | |
| 9 | 51 | pf |
| 15 | 910 | Ω |
| 17 | 11 | kΩ |
| 19 | 1.5 | kΩ |
| 22 | 820 | Ω |
| 27 | 7.5 | kΩ |
| 28 | 0.01 | μf |
| 29 | 5.0 | kΩ |
| 30 | 3.9 | kΩ |
| 31 | 10.0 | kΩ |
| 32 | 5.1 | kΩ |

Although the foregoing embodiment has been described in detail, there are obviously many other embodiments and variations in configuration which can be made by a person skilled in the art without departing from the spirit, scope, or principle of this invention. Therefore, this invention is not to be limited except in accordance with the scope of the appended claims.

I claim:

1. An emitter coupled binary circuit providing controlled hysteresis comprising two transistors each having an emitter, base and collector, means operably, connecting said collector of both said transistors to a supply voltage, means operably connecting said collector of a first of said transistors to said base of the second of said transistors, means interconnecting said emitters of said transistors, means operably connecting said emitters of both said transistors to ground, means for controlling hysteresis operably connecting said base of said second transistor to said collector of the same transistor, said last mentioned means including means operably connecting said collector of said second transistor to ground, said means for controlling hysteresis also including means operably connecting said base of said second transistor to ground, and means for applying a control pulse to said base of said first transistor thereby to bias said first transistor in accordance with the magnitude and polarity of said control pulse.

2. An emitter coupled binary circuit defined in claim 1 wherein said hysteresis controlling means comprises a plurality of resistor means and capacitor means positioned intermediate certain of said resistor means, and wherein said ground connecting means of said hysteresis controlling means including said capacitor means.

3. An emitter coupled binary circuit defined in claim 2 wherein said plurality of resistor means includes at least one variable resistor means operably connected between said second transistor collector and base and at least one variable resistor means operably connected between said second transistor base and ground.

4. An emitter coupled binary circuit defined in claim 2 wherein said plurality of resistor means includes fixed resistor means and variable resistor means in series relation connection between said collector and base, and fixed resistor means and variable resistor means in series relation connection between said base and ground.

5. An emitter coupled binary circuit defined in claim 1 wherein said hysteresis controlling means includes a first resistor means operably connected to said collector, a second resistor means operably connected to said first resistor means and to said base, and said ground connecting means for said collector operably connected intermediate said first and second resistor means, said collector ground connecting means including capacitor means.

6. An emitter coupled binary circuit defined in claim 1 wherein said hysteresis controlling means include a first resistor and a second resistor connected in series operably connected between said collector and base, and said collector to ground connection means comprising a capacitor connected at the juncture of said first and second resistors.

7. An emitter coupled binary circuit defined in claim 1 wherein said transistors are of the NPN type, the supply voltage is positive, the first of said transistors is in a normally nonconducting state, the second of said transistors is in a normally conducting state, and the control pulse is positive going.

8. The emitter coupled binary circuit of claim 1 further defined wherein said transistors are of the PNP type, the supply voltage is negative, the first of said transistors is normally nonconducting, the second of said transistors is normally conducting, and the control pulse is negative going.